UNITED STATES PATENT OFFICE.

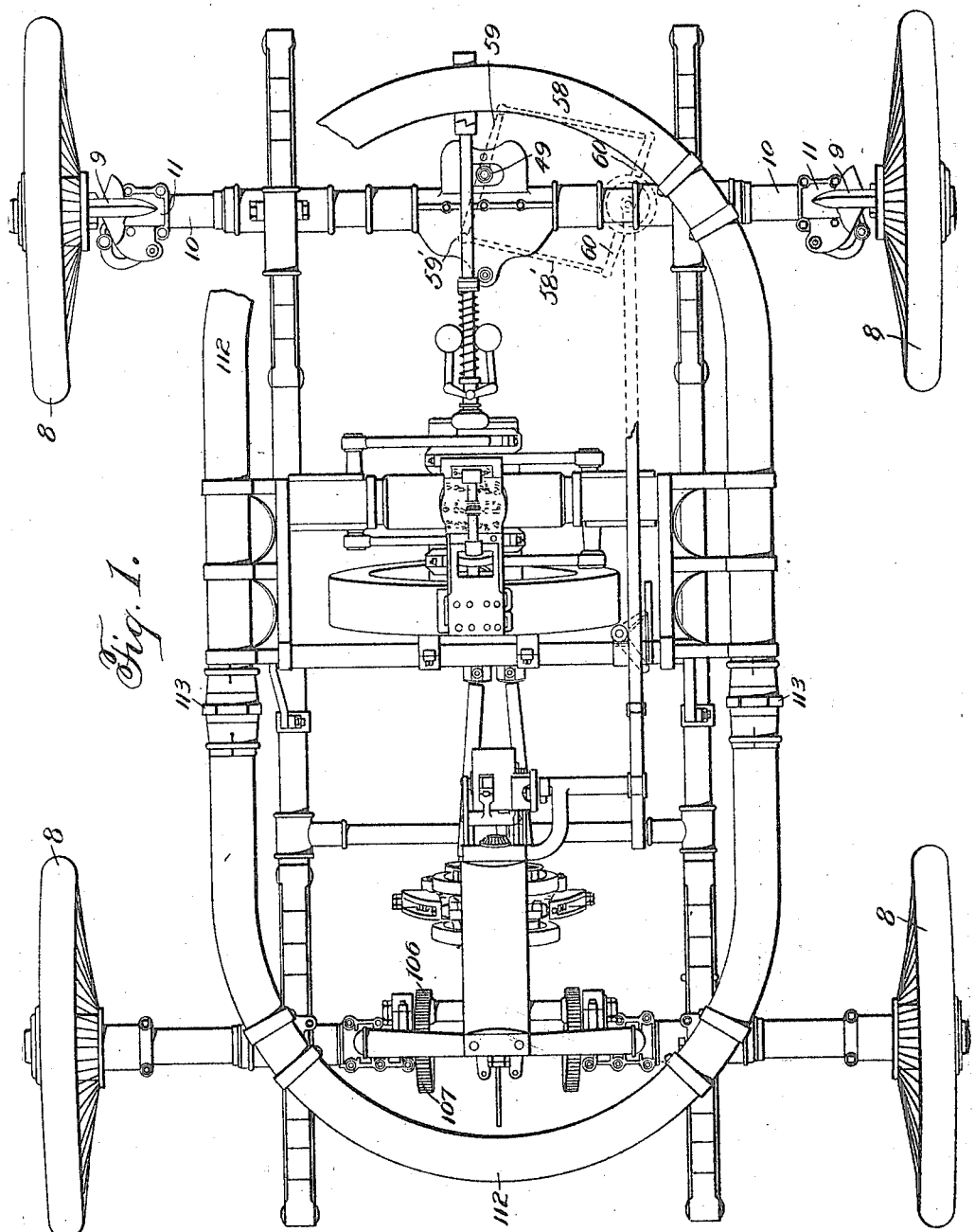

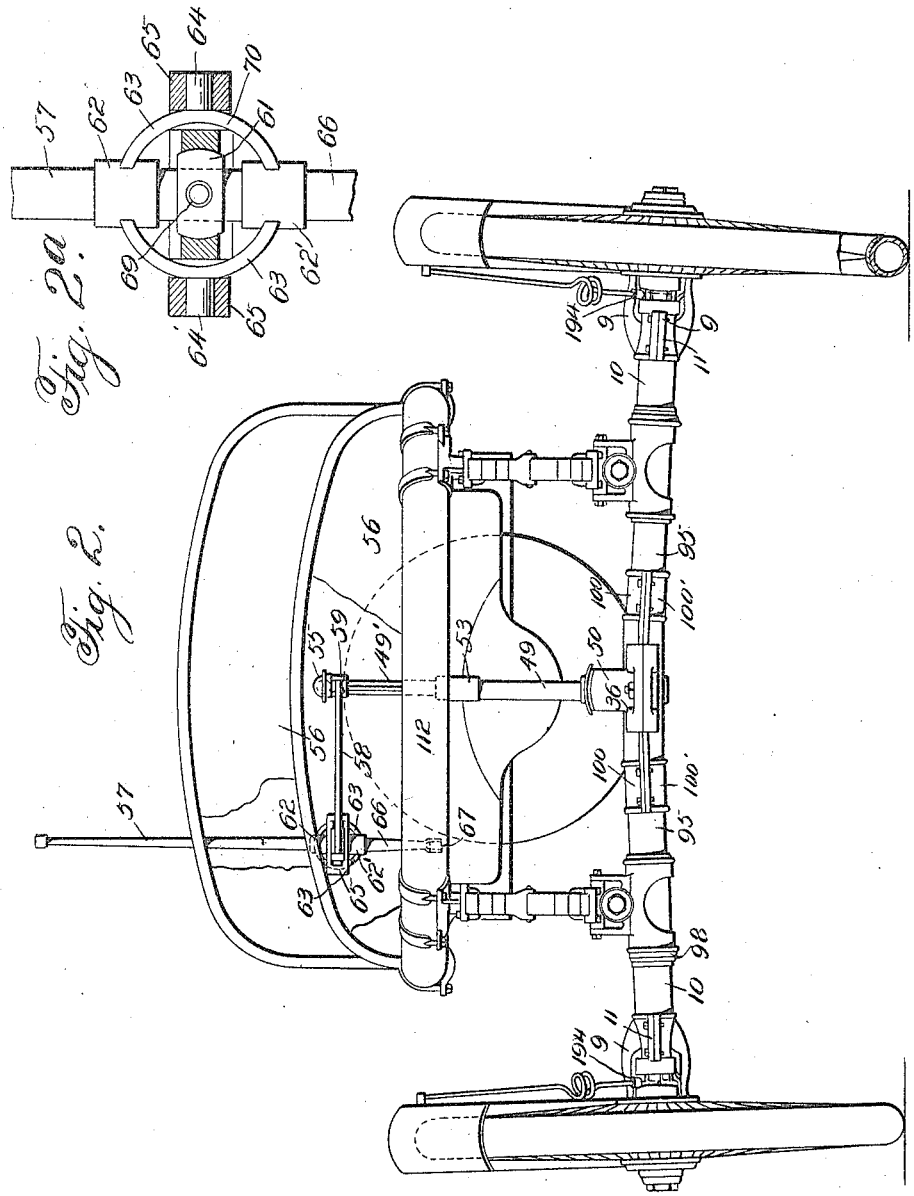

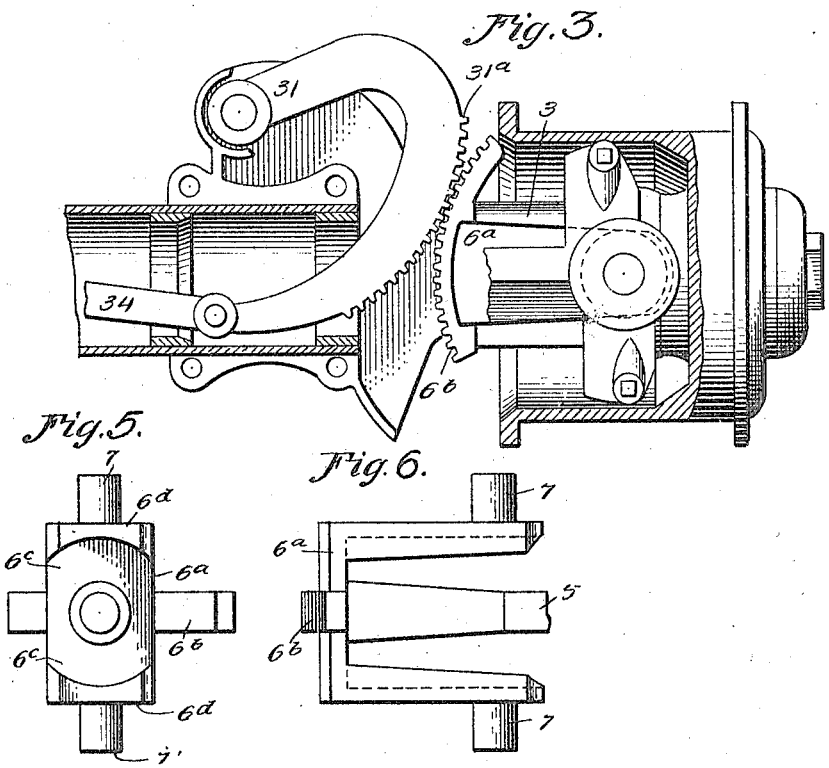

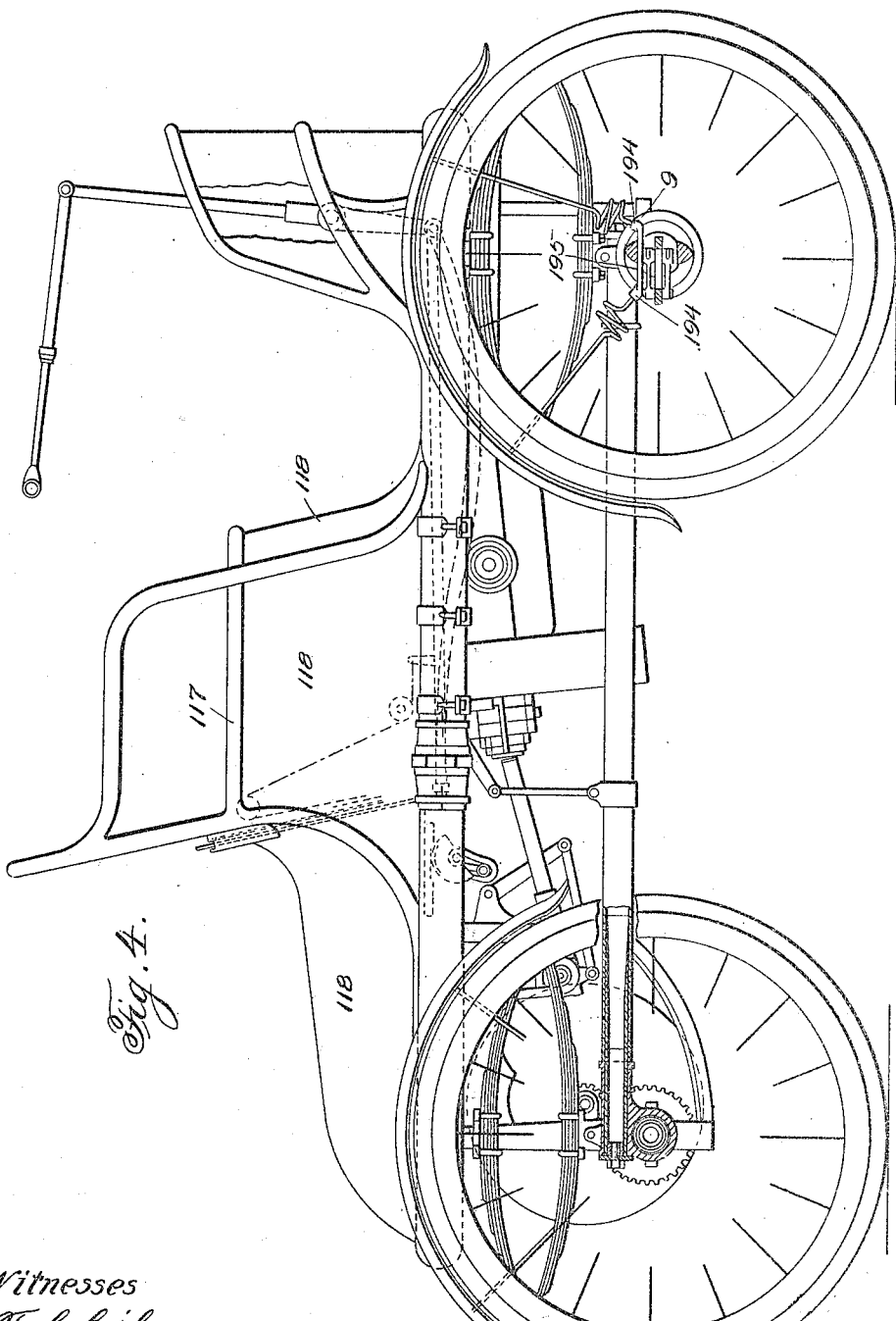

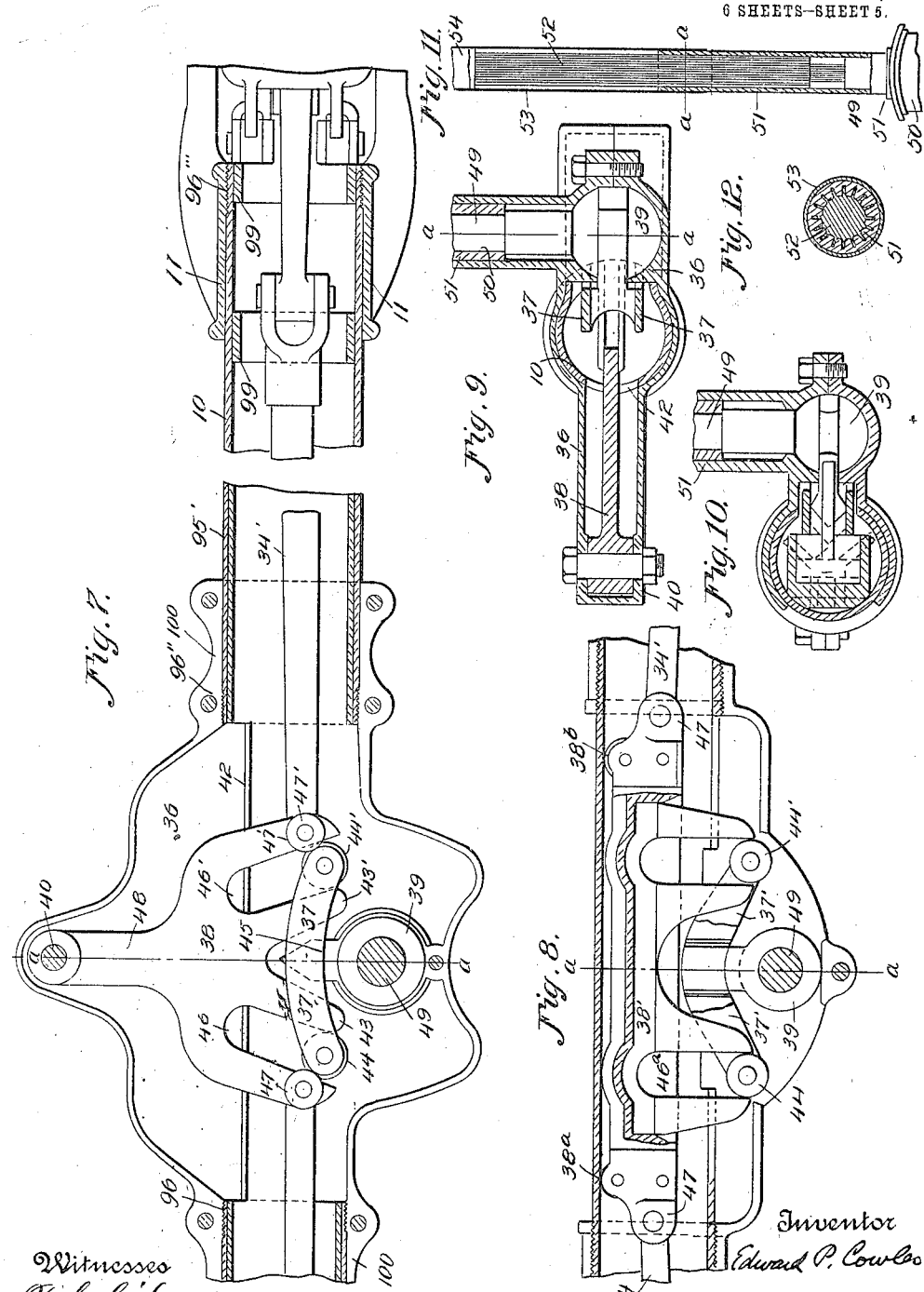

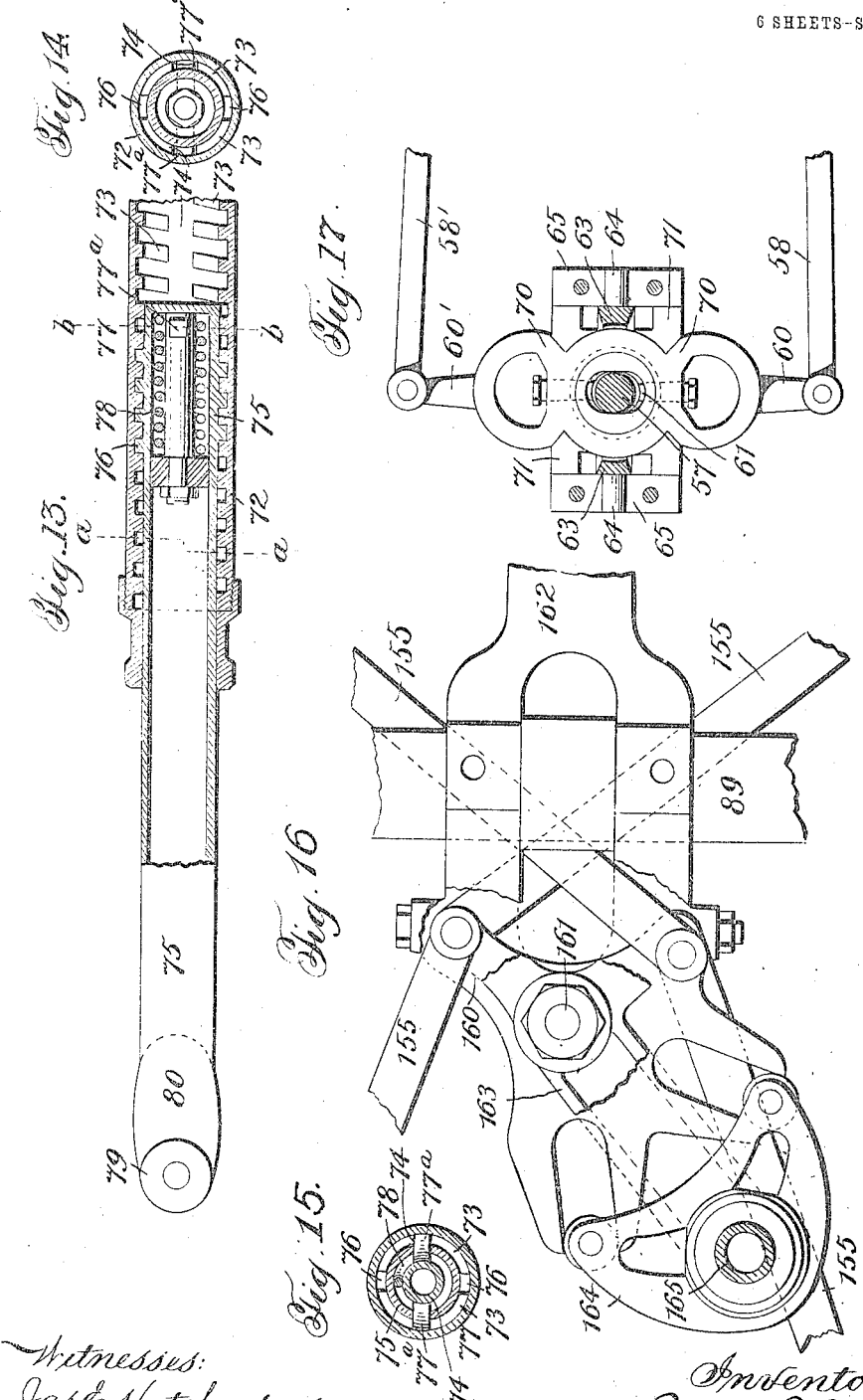

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,123,192.  Specification of Letters Patent.  Patented Jan. 5, 1915.

Original application filed September 6, 1901, Serial No. 74,497. Divided and this application filed August 9, 1912. Serial No. 714,297.

*To all whom it may concern:*

Be it known that I, EDWARD P. COWLES, a citizen of the United States, and resident of Sparta, in the county of Kent and State of Michigan, have invented certain new and useful Improvements in Motor-Vehicles, of which the following is a specification.

This application is a division of my prior application, Serial No. 74,497, filed September 6, 1901.

My present invention relates to improvements in motor vehicles and particularly to the running gear and steering mechanism of such vehicles.

One of the objects of the invention is to provide a steering mechanism of high precision, adapted to work with extreme sensitiveness and automatically locking when the vehicle is running in proximity to a straight line.

With this and other objects in view, the invention consists in the construction and arrangement of parts described in the following specification reference being had to the accompanying drawings in which, Figure 1 is a plan view, partly broken away of a motor vehicle embodying my invention; Fig. 2 is a view of the front end of said vehicle, partly broken away; Fig. 2ª is a vertical section through the bearing for the steering shaft; Fig. 3 is a horizontal section of a steering axle and hub and the steering mechanism which may be used instead of the forms specifically claimed in my application No. 74,497. Fig. 4 is a side elevation of the same, parts being shown in section, and a part broken away; Fig. 5 is an end elevation, and Fig. 6 is a side elevation of wheel spindle shown in Fig. 3. Fig. 7 is a horizontal section through the central portion of the forward axle, showing the cams for operating the rods which are connected with the steering wheels; Fig. 8 is a similar view showing a different arrangement of steering cams; Fig. 9 is a section on the line *a—a* of Fig. 7; Fig. 10 is a section on the line *a—a* of Fig. 8; Fig. 11 is a vertical sectional view through a portion of the steering shaft; Fig. 12 is a cross section on line *a—a* of Fig. 11; Fig. 13 is a view showing a portion of the steering lever in side view and longitudinal section, illustrating the devices for shortening and lengthening the lever; Fig. 14 is a section on the line *a—a*, Fig. 13; Fig. 15 is a section on the line *b—b*, Fig. 13; Fig. 16 is a plan view showing a portion of the steering mechanism for simultaneously turning four steering wheels; Fig. 17 is a view of the bearing for the steering lever taken horizontally through the center of the supporting block shown in Fig. 2.

Like parts are identified by the same reference numerals throughout the several views.

While my invention is applicable to all kinds of motor vehicles and to all kinds of motors, it is specially adapted to that form of driving gear shown and described in my Patent No. 654,716 dated July 31, 1900, and the driving gear outlined in the accompanying drawings is of that form.

One essential feature of an efficient motor vehicle steering mechanism is that there shall be no lost motion between the parts thereof and that the slightest movement of the steering lever shall produce a corresponding movement of the steering wheels. For this reason it is necessary that the fulcrums of the various levers have rigid metal connections and that the joints be kept free from dust to avoid wear. To gain this end I place practically all of the steering mechanism inside the front axle 10 which is a single tube of large diameter. This also has the effect of giving the front axle a more symmetrical appearance as the rods, levers, etc., usually exposed are concealed.

I have shown in Fig. 3 one form of mechanism for actuating the steering wheels, this mechanism comprising a curved lever 31 attached to the rod 34 and provided with teeth 31ª which mesh with corresponding teeth on the segmental rack 6ᵇ attached to the base 6ª of the trunnion 5.

In Figs. 3, 5 and 6 I have shown a form of trunnion base 6ª, which instead of being cup-shaped like the trunnion base claimed in my application, Serial No. 74,497, is forked. The inner side 6ᶜ of each fork arm is curved to conform to the curvature of the axle sleeve, while the outer sides 6ᵈ are flat and parallel, thus giving them practically a "channel iron" cross section. By giving the fork arms a channel iron section, and making them integral with the axle, base and trunnions, it is possible to obtain sufficient strength and stiffness within a small space and bring the arms near enough together to pass in between the hub cylinders to the plane of the wheel.

The operating devices of the steering mechanism (see Figs. 7 and 9) include two coöperating parts, a double cam 37 operated by the steering lever, and a swinging cam plate 38, said parts being pivotally mounted at 39, 40, respectively, between the upper and lower halves of a dust-proof casing 36 which is firmly clamped to the axle tube 10, preferably at its center and extends forward and rearward therefrom. The axle tube 10 is provided with suitable slots 42 to permit of the passage of the parts 37, 38.

Double cam 37 is substantially of the form of a T, the central arm of which is connected to the ball 39 forming the pivotal mounting of said cam, and has suitable free plates at its end, between which are mounted rollers 44, 44'. This construction is for the purpose of allowing the arms of cam plate 38 to pass through as said plate swings on its pivot 40, and to give the pivot 39 a bearing within the casing 36. These rollers 44, 44' extend through slots or forks 46, 46' formed in cam plate 38. The outer arms of the cam plates 38 are pivotally connected at 47, 47' to the rods 34, 34', which extend to the ends of the axle 10 and are connected to the bent levers 31 of the steering knuckles as hereinbefore described. Rollers 44, 44', are preferably placed so that lines connecting their centers with the center or axis of pivot 39 would form a little more than a right angle with a line connecting the centers of said rollers and the axis of pivot 40. In other words the central lines of slots 46, 46' are tangent to a circle described by the centers of rollers 44, 44' in moving about pivot 39. It will be seen that rollers 44, 44' act alternately on cam plate 38. That is, when one roller moves into engagement with its respective slot in the cam plate 38 the other of said rollers moves out of engagement with said plate. It is also obvious that from the central position of the parts 37, 38, which are the positions occupied by said parts during movement of the vehicle in a straight line, the initial movement of cam plate 38 with respect to the movement of double cam 37 either way is very slow owing to the tangential direction of slots 46, 46' with respect to circle described by rollers 44, 44'. This movement can be varied from zero to any degree, by placing the centers of rollers 44, 44', more or less in advance of tangential position, also by varying direction of slots 46, 46' or by making them curved instead of straight. It is also obvious that the movement of cam plate 38, from its central position is constantly accelerated until either roller is in line with axes of pivots 39 and 40 which positions answer to the extreme right and left turn of steering wheels. This acceleration is due partly to the rollers 44, 44' acting more at right angles to the direction of slots 46, 46', and partly to the shortening of radius in cam plate 38, as the rollers advance from central position.

Owing to the relation of parts 37, 38 above described it will be seen that cam plate 38 has little or no power to move the cam 37 when the parts are in their normal positions and this inability is augmented and increased by the large diameter of pivot 39, so that rollers 44, 44' must advance some distance in slots 46, 46', before cam plate 38 can overcome the friction of said pivot. In operating the steering device power applied to the steering lever has such a great leverage on the pivot 39 that the friction thereof does not perceptibly impede the operation. When, however, power is applied through the rods 34, 34' and cam plate 38, to reverse their movement, the friction of pivot 39 has such a great leverage on the power that it is absorbed and neutralized, and as the power applied to rods 34, 34' is increased the friction on pivot 39 is proportionately increased, because such power acts to directly force the pivot 39 against its seat, making a positive dead lock, when operating in said central position. It is obvious therefore that any force acting on cam plate 38 through rods 34, 34' and steering knuckles, such as the steering wheels striking obstructions, ruts, etc., will have no effect to turn double cam 37 and therefore the steering mechanism is practically automatically locked when the vehicle is moving in approximately a straight line. When turning curves and the like, the driver's attention is fixed, and the grip on steering lever firm, and locking further than this is not desired.

In Figs. 8 and 10 I have illustrated a slightly modified form of cam plate. Referring to these figures it will be seen that the plate 38' to which the rods 34, 34' are connected, is provided with suitable rollers 38ª, 38ᵇ, which ride against the inner surface of the axle 10 as said plate is moved longitudinally thereof. In this construction the slots 46ª, 46ᵇ, extend at right angles to the line of movement of the plate 38' and rods 34, 34'. I prefer, however, the form first described because the differentiation to cause the steering wheels to always turn with their revolving planes tangential to concentric circles is accomplished wholly or in part by the relative position of the pivotal attachment of rods 34, 34' to cam plate 38. With the form shown in Figs. 8 and 9 this differentiation would have to be accomplished by making the geared segments 31ª and 6ᵇ, Fig. 13, elliptical or by varying the position of pivots and link in curved lever 31 of the steering knuckle.

Double cam 37 is rotated back and forth to operate the steering knuckles by a vertical shaft 49, which is connected at its lower end to the ball 39 forming the pivotal mounting of the cam 37. To accommodate the lateral sway of the body of the vehicle into which the upper end of the shaft 49 extends, and the vertical twisting of front axle 10, consequent from running over uneven ground, the shaft 49 has the above described ball and socket joint 39 with casing 36. which permits the shaft to swing laterally. The cross plates of the cam 37 between which the rollers 44, 44' are mounted are farther apart and said rollers are longer than is required to allow cam plate 38 to pass through, which permits said cam 37 to rock vertically with ball 39, and shaft 49, rollers 44, 44', sliding through slots 46, 46'. Double cam 37, however, can have a permanent bearing in casing 36, and shaft 49 be flexibly jointed to it. An oblong box 50, extending up from casing 36, and having a bearing in which shaft 49 turns, sliding laterally in the upper end, prevents shaft 49 from swinging forward and back with respect to axle 10 and as the upper end of shaft 49 has a bearing in the body, it also prevents axle 10 from turning, or maintains it in an upright position. The casing 36, can, however, have a rear extension connected to a cross-bar between the reaches to prevent the axles 10, from turning and in such construction the oblong box. 50, would be dispensed with. To accommodate the vertical play of body with respect to axle 10, shaft 49 is made extensible, one portion 51 being tubular, the other 52 sliding into, or "telescoping" with it, said parts being prevented from rotating with respect to each other, by slots and pins or feathers. (See Figs. 11 and 12.) The vertical play of the body is constant and if there were only one or two pins or feathers, as is the custom in constructing extensible shafts, they would quickly wear, and cause much lost motion. To overcome this difficulty I form teeth entirely around the member 52 like "pinion wire" and on the inside of tube 51 form a corresponding number of teeth to engage those of the member 52, said teeth being of considerable length. That is, in the embodiment of my invention herein illustrated the member 52 has 16 teeth each one-eighth inch deep, and the member 51 has teeth six inches long, so there are always in contact twelve square inches of wearing surface, notwithstanding the restricted space. This makes the steering shaft, as regards rotation, practically a solid shaft, and in regard to wear practically indestructible. A light metal tube 53 attached to the upper end of the member 52 has a close sliding fit on member 51 and excludes dust.

The upper end of the shaft 49 has a ball and socket connection 55 (Fig. 2) with the foot plate 56 of the body of the vehicle. As hereinbefore stated, I preferably place this shaft and casing 36 at a point midway of the length of the axle in order to give a more symmetrical appearance, but it is generally preferred to have the steering lever 57 placed to the right of the center. I preferably make connections for this offset by means of two parallel links 58, 58', Figs. 1 and 2, connecting the diametrically opposite arms 59, 59' and 60, 60', respectively on shaft 49, and steering lever 57. It is not desirable to swing the steering lever more than 60° or 70°, while double cam 37 swings 130°. I accomplish this by making arms 60, 60', on the steering lever correspondingly longer than arms 59, 59' on the shaft 49. It will be observed that this link connection removes all thrust from the bearings of the lever 57 and shaft 49 in the vehicle body and practically doubles the length of arms 59, 60 largely eliminating wear and lost motion.

As hereinbefore stated my present invention is specially adapted for use in connection with the driving mechanism shown in my Patent No. 654,716, dated July 31, 1900. Referring to that patent it will be seen that the steering lever, besides its function of turning the front wheels to guide the machine by a lateral swing in a horizontal plane, like the tiller of a boat, serves also to control the speed of, stop, or reverse the motor, etc., by a back and forward swing in a vertical plane. This double function is accomplished in the present instance by providing a mounting of peculiar construction for the steering lever. This lever 57, as shown in Figs. 2, 2ª and 20, is journaled in two bearings 62, 62' on opposite sides of a ring 63, which has two diametrically opposite trunnions 64, 64', the axes of which extend at right angles to the center line of the bearings 62, 62'. These trunnions have bearings in a piece 65 firmly secured to the foot plate 56 of the vehicle body. A link 66 extending down from the ring 63ª connects the steering lever with a rod 67, leading to the motor controlling mechanism 68. A universal joint 69 arranged between the bearings 62, 62', and concentric with trunnions 64, 64', and said bearings connect and communicate the rotary motion of lever 57 to arms 60, 60', which are kept horizontal by their hub 70, revolving between guides 71, on plate 65. In this manner steering lever 57 is free to swing back and forward in a vertical plane, while its rotary motion is communicated to arms 60, 60' and the two functions do not interfere with each other.

It is desirable to have the arm by which the movements of the steering lever are controlled extensible and especially so in this case where it has considerable motion to and from the operator. Referring particularly to Figs. 4, 13, 14 and 15, it will be seen that I accomplish this end by constructing the arm in two parts, part 72 being a tube which is connected to the lever 57 and having, preferably, a series of ring teeth 73 on its inner surface like rack teeth. For convenience in construction these teeth 73 may be spirally formed as shown. Said teeth are cut away at 74, forming one or more slots or grooves. The other part 75 of the steering arm has corresponding threads 76 formed about its inner end, which extends into said tubular member 72. The threaded end of the part 75 is so grooved that the remaining portions of the thread form longitudinally-extending ribs which can, when properly adjusted, slide freely in the slots 74, and when the parts 72, 75 are adjusted to bring the ribs 76 in alinement with the slots 74, the part 75 slides or telescopes in and out of part 72, and when turned in either direction said parts are locked together at any longitudinal adjustment. The part 75 of the steering arm may be hollow and within a chamber formed at the inner end thereof is arranged a plug 77 having feathers fitting into the slots 74, and permitting it to slide freely longitudinally of the part 72 but preventing rotation of said plug in the tube 72. The plug is rotatably mounted in the part 75 and coiled spring 78 connects the two and acts to turn part 75 back to its normal position of engagement with the tubular part 72 when released after being unlocked by rotating it in said part 72. That is, when the operator's hand is removed from handle 79 it, through the part 75, is locked to part 72 automatically. Preferably I make handle 79 in the form of a short cylinder extending at right angles to the part 75 of the steering arm. The end of 75 is flattened and attached to handle 79 at its center, the flattened portion 80 passing between the first and second or second and third fingers when grasping the handle. This makes a very light, and neat appearing handle and one on which a firm and secure grip of the hand can be had. Preferably I arrange it so that its normal position is horizontal and by turning it into perpendicular position it disengages the parts 75, 72. It will be observed that this steering arm has the important advantage that it can be shortened or lengthened without disturbing the grip of the steering hand or interfering with its function of steering, and does not require the use of the operator's other hand to loosen or fasten any part.

It will be seen that besides minor advantages, there are two very important ones gained by this improved steering mechanism. 1st. A very sensitive movement for all maneuvering required in straight forward running, the steering arm having a considerable swing for a slight movement of the wheels, and increasing rapidly toward extreme movement, enabling the operator to handle the machine with extreme delicacy and precision at very high speed. At the same time the general or complete movement is very prompt and quick. 2nd. Automatically locking for all maneuvering required in straight forward running, making it safe to remove the hand from the steering arm at such times.

The casing 36 of the steering mechanism serves as a heavy reinforcement for the center of the front axle, the semi-hubs 100, 100' at each end thereof firmly clamping the tube 10 with short tube 95. In this case, as tube 10 passes through unbroken, the end of tube 95 only is threaded within the hubs 100, as shown at 96'', Fig. 7. The reinforcement 95 is extended along the axle and nut 98 clamps the end firmly thereto. The outer ends of axle 10 are threaded into the sockets 11 at 96''', Fig. 7, and within each of said sockets are arranged reinforcing rings or tubes 99.

The body frame consists preferably of two U-shaped pieces of tubing 112, with their straight ends joined together as at 113, forming a frame preferably with semi-circular ends and straight sides. On this frame any form of a vehicle body can be placed, and such body can be made very light and of any material or any fancied design, as the rigidity of the frame relieves it of all strain.

Having thus described my invention, what I claim as new and desire to secure by Letters Patent is:

1. In a motor vehicle, the combination of a tubular axle, steering wheels mounted at the ends of the axle, and means for actuating said steering wheels arranged within the tubular axle.

2. In a motor vehicle, the combination of a tubular axle, steering wheels mounted at the ends of the axle, levers fulcrumed on the axle near the ends thereof and connected to the steering wheels, and means arranged within the axle for actuating said levers.

3. In a motor vehicle, the combination of a tubular axle, steering wheels mounted at the ends of the axle, levers fulcrumed at one side of the axle, near the ends thereof, and each having an arm extending into the interior thereof, connections between the steering wheels and said levers, rods arranged within the axle and connected to the said lever arms therein, and means for reciprocating said rods.

4. In a motor vehicle, the combination of a tubular axle, steering wheels supported therefrom at points beyond the ends of the axle, a curved lever fulcrumed at one side of the axle and having its free end extending into the end of the axle, links connecting said lever with the steering wheel, and a reciprocating rod for actuating said lever arranged within and extending longitudinally of the axle.

5. In a motor vehicle, the combination of a tubular axle, steering wheels supported at the ends of the axle, rods arranged within the axle and connected to said steering wheels, an actuating shaft, and mutually engaging devices connected to said shaft and to said rods within the axle, said devices acting to automatically lock the steering wheels when the vehicle is moving in substantially a straight line, independently of power applied to the actuating shaft.

6. In a motor vehicle, the combination of an axle, steering wheels supported at the ends of the axle, a plate pivotally mounted at the middle of the axle and provided with two transverse slots, connections between said plate and the steering wheels, an actuating shaft adapted to be adjusted about an axis extending parallel to the axis of the pivot of said slotted plate, and arms connected to said shaft and extending into the slots in said plate, whereby by moving the shaft the steering wheels can be adjusted as desired and when said plate and arms are in the normal midway positions, occupied when the vehicle is moving in substantially a straight line, said wheels will be automatically locked in the position they then occupy.

7. In a motor vehicle, the combination of a tubular axle, a casing arranged at the middle and communicating with the interior of the axle, steering wheels supported at the ends of the axle, a plate pivotally mounted within said casing and having two bifurcated arms at one side, levers fulcrumed on the axle near the ends thereof and connected to the steering wheels, rods connecting said levers and pivoted plate within the axle casing, an actuating shaft mounted in a suitable bearing in said casing, and adapted to be controlled from body or vehicle, and arms connected to said shaft and each adapted to engage one of the bifurcated arms of said pivoted plate to adjust the steering wheels as desired.

8. In a motor vehicle, the combination of an axle, steering wheels mounted at the ends of the axle, a plate pivotally mounted at or near the middle of the axle, and having two slots formed therein, connections between said plate and the steering wheels, an actuating shaft mounted to rotate about an axis parallel to that of the pivot of said slotted plate, and two antifriction rollers connected to said shaft and adapted to engage with the slots in said plate, the central longitudinal lines of said slots being radial to the pivot of said plate and tangent to the circle described by said antifriction rollers, whereby the initial movement of said plate under the influence of said shaft will be relatively slow and will be accelerated as said rollers approach the pivot of said plate.

9. In a motor vehicle, the combination of an axle, steering wheels supported at the ends of the axle, a wrist plate having transverse slots, links connecting said plate with the steering wheels, and a steering shaft having cam surfaces adapted to engage with said slots.

10. In a motor vehicle, the combination of an axle, steering wheels supported at the end of the axle, a pivotally mounted wrist plate between the wheels, said plate having two converging slots, links connecting said plate with the steering wheels, and a steering shaft having cam surfaces adapted to engage with said slots.

11. In a motor vehicle, the combination of the steering wheels, a plate having a pair of cam-slots, links connecting said plate with the steering wheels, and a steering shaft having a pair of cam-surfaces adapted to engage with said slots.

12. In a motor vehicle, the combination of the steering wheels, a plate having a pair of cam-slots, links connecting said plate with the wheels, a frictionally encumbered steering shaft, and a pair of cam-surfaces connected with said shaft and adapted to engage with said slots.

13. In a motor vehicle, the combination of the steering wheels, a plate having a pair of cam-slots, links connecting said plate with the wheels, a shaft having an enlarged frictionally held bearing adjacent to said plate, and a pair of cam-surfaces connected with said shaft and adapted to engage with said slots.

14. In a steering gear, a steering post, a double crank on the lower end thereof, a plate pivoted eccentrically of the steering post, means carried by the double crank for tilting the pivoted plate when the steering post is turned, steering knuckles, and a connection from the steering knuckles to the pivoted plate.

15. In a motor vehicle, the combination of a tubular axle, a horizontally movable trunnion at the end of the axle, a steering wheel upon said trunnion, a segmental rack at the base of said trunnion, a curved lever fulcrumed at one side of the axle, and having its free end extending into the end of the axle, teeth on said lever engaging said rack, and a reciprocative rod for actuating said lever arranged within and extending longitudinally of the axle.

In testimony whereof I affix my signature in presence of two witnesses.

EDWARD P. COWLES.

Witnesses:
BERT BEST,
IVAN L. SMITH.